(12) United States Patent
Owada

(10) Patent No.: US 7,237,400 B2
(45) Date of Patent: Jul. 3, 2007

(54) HIGHLY-EFFICIENT FREEZING APPARATUS AND HIGHLY-EFFICIENT FREEZING METHOD

(75) Inventor: Norio Owada, Chiba (JP)

(73) Assignee: ABI Co., Ltd, Chiba (JP)

( * ) Notice: Subject to any disclaimer, the term of this patent is extended or adjusted under 35 U.S.C. 154(b) by 447 days.

(21) Appl. No.: 10/493,827

(22) PCT Filed: Nov. 1, 2002

(86) PCT No.: PCT/JP02/11430

§ 371 (c)(1),
(2), (4) Date: Apr. 28, 2004

(87) PCT Pub. No.: WO03/038355

PCT Pub. Date: May 8, 2003

(65) Prior Publication Data

US 2005/0005611 A1     Jan. 13, 2005

(30) Foreign Application Priority Data

Nov. 1, 2001    (JP) .............................. 2001-337036

(51) Int. Cl.
*F24F 3/16*     (2006.01)
*F25D 23/00*    (2006.01)
(52) U.S. Cl. ............................................ 62/264; 62/78
(58) Field of Classification Search ............. 62/264, 62/78
See application file for complete search history.

(56) References Cited

U.S. PATENT DOCUMENTS

| | | | | |
|---|---|---|---|---|
| 2,288,812 A | * | 7/1942 | Linder | 315/39 |
| 2,975,277 A | * | 3/1961 | Von Ardenne | 250/295 |
| 3,130,559 A | * | 4/1964 | Sterling | 62/256 |
| 3,338,507 A | * | 8/1967 | McKeever | 417/49 |
| 4,319,460 A | * | 3/1982 | Williams | 62/78 |
| 4,524,079 A | * | 6/1985 | Hofmann | 426/234 |
| 4,888,960 A | * | 12/1989 | Lara | 62/298 |
| 5,230,220 A | * | 7/1993 | Kang et al. | 62/78 |
| 5,527,105 A | * | 6/1996 | Riach, Jr. | 312/406 |
| 5,675,983 A | * | 10/1997 | Ibrahim | 62/255 |
| 6,159,432 A | * | 12/2000 | Mallinson et al. | 422/186.04 |
| 6,250,087 B1 | * | 6/2001 | Owada et al. | 62/62 |
| 2004/0007000 A1 | * | 1/2004 | Takeda et al. | 62/78 |

* cited by examiner

*Primary Examiner*—William C. Doerrler
(74) *Attorney, Agent, or Firm*—Young & Thompson

(57) ABSTRACT

An object accommodated in an internal space of a freezer is quickly cooled to a predetermined temperature with preventing water from freezing while an oscillating electric field of, preferably, a variable frequency in the range of 50 Hz to 5 MHz and/or a magnetic field are applied to the object, or further ionic air is added to clod air, and subsequently the object is instantaneously frozen at the predetermined temperature. Preferably, the magnetic field is a static magnetic field and/or a variable magnetic field.

35 Claims, 6 Drawing Sheets

# HIGHLY-EFFICIENT FREEZING APPARATUS AND HIGHLY-EFFICIENT FREEZING METHOD

TECHNICAL FIELD

The present invention relates to methods for freezing foodstuffs, food products, organisms, and other materials, and particularly to a freezing apparatus for producing highly fresh, high-quality frozen products and a freezing method in the freezing apparatus that can maintain the freshness of the material while preventing the destruction of the cells of the material.

High-performance freezing herein refers to a process producing highly fresh, high-quality frozen product while preventing the destruction of the cells of the material to maintain the freshness.

The present invention also relates to a freezing apparatus for frozen products and refrigerated or fridge-frozen preserves, such as those of foodstuffs, food products, and organisms, and particularly to a variable magnetic field generator capable of uniformly applying a variable magnetic field to objects to be frozen.

BACKGROUND ART

In order to preserve foodstuffs, food, organisms, and other materials with freshness maintained for a long time, frozen storage has been conventionally applied. However, known frozen storage cannot perfectly prevent changes in color tone of frozen materials, deterioration in taste, and occurrence of dripping. More specifically, it cannot prevent deterioration of the quality or freshness due to, for example, dripping resulting from thawing. Materials to be frozen, such as foodstuffs, food products, and organisms, contain a large amount of water. The water contained in these materials is constituted of bound water tied to protein or other molecules in the materials and free water freely transferring in the materials without being tied to the molecules. In freezing, the free water is frozen, so that ice crystals grow. If the ice crystals grow coarse, the cells of the materials are destructed. In foodstuffs and food products, and so forth, once the cells of the material are destructed, dripping, which makes it difficult to restore the organisms to the original state, occurs while the material is thawed.

Coarseness of the ice crystals is caused at freezing by a slowly passing through the range of ice crystallization temperature. Accordingly, in order to prevent such coarseness of the ice crystals, the material to be frozen may be immersed in a liquid cooling medium or a liquid cooling medium may be sprayed onto the material so that the material temperature may quickly passes through the range of ice crystallization temperatures to cool the material rapidly. Although the process of immersing the material to be frozen into a liquid cooling medium or spraying a liquid cooling medium onto the material can cool the surface layer of the material quickly, a frozen layer is produced in the surface layer. The cooling rate of the inner side of the frozen material is determined by heat transfer from the surface, so the frozen layer in the surface layer interferes the heat transfer to the inner side, thus the cooling of the inner side of the frozen material is delayed. Consequently, the coarseness of the ice crystals disadvantageously occurs in the inside of the frozen material; hence, the coarseness of the ice crystals is not prevented.

To solve the problem, a method for super-quickly cooling has been disclosed in, for example, WO 01/24647 A1. This method has the step of quickly freezing an object by lowering the ambient temperature of the object to a temperature in the range of −30 to −100° C. while a unidirectional magnetic field is applied to the object or further the step of cooling the object with cold air flow at 1 to 5 m/s and applying a sound wave in the audio frequency band to the cold air flow, or further includes the step of applying an electric field to the object.

WO 01/24647 A1 also proposes a super-quickly freezing apparatus. This apparatus comprises a freezer capable of lowering its internal temperature around the object to be freezed in the range of −30 to −100° C.; and magnetic field-generating means for applying a magnetic field fluctuating in one direction to the object, comprising static magnetic field-generating means and dynamic magnetic field-generating means.

According to the technique described in WO 01/24647 A1, the cells of the frozen material are prevented from being destructed and the food after thawing has a taste similar to its raw state. Thus, the quality of food preserved in frozen storage is fairly improved. In some types of food, however, the destruction of the cells cannot be completely prevented even by this technique, and quality degradation occurs undesirably in the food frozen. In addition, the inventor of the present invention found in the technique of WO 01/24647 A1 that the variable magnetic field is so nonuniform that the effect of the variable magnetic field is not evenly exerted on the frozen material, and that a part of the frozen food is degraded in quality.

In view of these problems, an object of the present invention is to provide a high-functional freezing apparatus and a high-functional freezing method that allow any type of food product, foodstuff, and organism without destruction of their cells to be preserved in frozen storage.

Another object of the present invention is to provide a high-functional freezing apparatus containing means for simultaneously applying an electric field of variable frequency and a uniform magnetic field to food and organism cells, and a high-functional freezing method.

DISCLOSURE OF INVENTION

In order to accomplish these objects, the inventor of the present invention has conducted intensive research on a method for preventing the destruction of cells in materials in freezing. As a result, the inventor discovered that it is effective in preventing the coarseness of ice crystals and the destruction of the cells to quickly cool the maximum ice crystallization temperature range, in which ice crystals grow at a high rate, and to suppress the nucleation of ice crystals. The inventor also discovered through further continued research that, application of an oscillating electric field and/or magnetic field to an object to be frozen suppress the nucleation of ice crystals, so that supercooling can be achieved without nucleation of ice crystals down to −10° C. In particular, the inventor has reached a conclusion that it is effective in preventing the nucleation of ice crystals to apply an oscillating electric field of variable frequency in the range of 50 Hz to 5 MHz.

Furthermore, the inventor discovered that, by simultaneously applying an oscillating electric field and a magnetic field to the object, the free water in the object hydrates with protein and carbohydrate, which are ground substances in food and organisms, to change into bound water forming molecules of hydrated higher order structures. Consequently, the inventor found that the free water is reduced, so that the probability of ice crystallization decreases. Thus, the nucleation of ice crystals can further be prevented.

Under the idea that it is important to apply a strong, uniform variable magnetic field to the object to be frozen in order to prevent the nucleation of ice crystals, the inventor has conducted intensive research on variable magnetic field-generating means capable of generating a strong, uniform variable magnetic field. The intensity of a magnetic field decreases in inverse proportion to the square of the distance from a magnetic field source. The research has been conducted according to the concept of disposing a variable magnetic field source close to an object to be frozen (hereinafter may be referred to as the object) as much as possible in order to obtain a strong, uniform variable magnetic field. As a result, the inventor found that it is effective to dispose a plurality of variable magnetic field sources in parallel, in series, or crosswise along a holder holding the object so as to be across the holder or so as to surround or sandwich the holder.

The inventor also found that addition of ionic air flow to cold air for cooling the object accelerates heat transfer to remarkably increase the cooling rate of the object.

The present invention has been accomplished through continued research according to the above-described findings.

The summary of the present invention is as follows:

(1) A high-functional freezing apparatus including a freezer; and at least one means selected from the group consisting of oscillating electric field-generating means for applying an oscillating electric field to an object or objects to be frozen accommodated in or being conveyed in succession to an internal space of the freezer and magnetic field-generating means for applying a magnetic field to the object or the objects.

(2) A high-functional freezing apparatus according to (1), in which the oscillating electric field has a variable frequency in the range of 50 Hz to 5 MHz.

(3) A high-functional freezing apparatus according to (1) or (2), in which the magnetic field-generating means is at least one means selected from the group consisting of static magnetic field-generating means for generating a static magnetic field and/or variable magnetic field-generating means for generating a variable magnetic field.

(4) A high-functional freezing apparatus according to (3), in which the static magnetic field-generating means is a permanent magnet.

(5) A high-functional freezing apparatus according to (3), in which the variable magnetic field-generating means is a dielectric coil.

(6) A high-functional freezing apparatus according to (3), in which the intensity of the static magnetic field is in the range of 1 to 10,000 Gauss and the intensity of the variable magnetic field is in the range of 1 to 1,000 Gauss.

(7) A high-functional freezing apparatus according to (4), in which the permanent magnet is disposed on an external wall of the freezer or on the rear side of a holder for holding the object and the dielectric coil is disposed so as to be across the holder, so as to sandwich or so as to surround the holder, without blocking cold air.

(8) A high-functional freezing apparatus according to (3), in which the freezer is of a rack-type batch-style, and the variable magnetic field-generating means comprises a plurality of electromagnetic coil units that generate a variable magnetic field by passing an alternating current therethrough and each electromagnetic coil unit is disposed so as to be across or surround a holder for placing the object on or holding the object and the plurality of the coil units are arranged so as to be in parallel, in series, or crosswise to the rack-type holder.

(9) A high-functional freezing apparatus according to (3), in which the freezer is of a tunnel-type, and the variable magnetic field-generating means for applying a variable magnetic field to the objects being conveyed by a net conveyer belt into and frozen in the internal closed space of the freezer in succession is an apparatus for generating a variable magnetic field which comprises a plurality of electromagnetic coil units for generating the variable magnetic field by applying an alternating current, wherein a pair of electromagnetic coil units is disposed in such a manner that each electromagnetic coil unit of the pair is separated by the net conveyer belt for placing the objects on or holding the objects and a plurality of the pairs are arranged in parallel along the moving direction of the net conveyer belt.

(10) A high-functional freezing apparatus according to (3), in which the freezer is of a spiral-type, and the variable magnetic field-generating means for applying a variable magnetic field to the objects being conveyed by a net conveyer belt into and frozen in the internal closed space of the freezer in succession is an apparatus for generating a variable magnetic field which comprises a plurality of electromagnetic coil units for generating the variable magnetic field by applying an alternating current, wherein a pair of electromagnetic coil units is disposed in such a manner that each electromagnetic coil unit of the pair is separated by the net conveyer belt for placing the objects on or holding the objects and a plurality of the pairs are arranged in parallel along the moving direction of the net conveyer belt.

(11) A high-functional freezing apparatus according to any one of (8) to (10) in which each of the electromagnetic coil units comprises: a coil base with a predetermined shape for forming a coil; an electromagnetic coil formed of a predetermined turns of highly conductive wire with an insulative coating, wound around the coil base; and a caulking compound sealing the electromagnetic coil.

(12) A high-functional freezing apparatus according to (11), in which the coil base comprises an electrically insulative, water-resistant, heat-resistant, and magnetically permeable material.

(13) A high-functional freezing apparatus according to (12), in which the material of the coil base is a plastic.

(14) A high-functional freezing apparatus according to any one of (1) to (13), in which the alternating electric field-generating means comprises at least one pair of electrodes having electrodes opposing each other so as to be separate by the object and an oscillating electric field generator for applying an oscillating electric field between the electrodes.

(15) A high-functional freezing apparatus according to (14), in which the electrodes comprises a sheet of a stainless steel or a steel plated with silver or gold, having a plurality of protrusions.

(16) A high-functional freezing apparatus according to any one of (1) to (15), further comprises air blowing means for blowing cold air in the freezer to the object and an ionic air generator for adding ionic air to the cold air blown from the air blowing means.

(17) A high-functional freezing apparatus according to (16), in which the ionic air generator comprises a tubular anode, a linear cathode entering into the inside of the tubular anode, and a voltage generator for applying a voltage between the anode and the cathode.

(18) A high-functional freezing apparatus according to (17), in which the tubular anode and the linear cathode are made of stainless steel or steel plated with silver or gold.

(19) A high-functional freezing apparatus according to any one of (1) to (18), in which the surface of the inside wall of the freezing room comprise a material capable of absorbing far infrared rays.

(20) A high-functional freezing apparatus according to any one of (1) to (19), wherein a honeycomb formed of a highly heat-conductive material is provided in a flow path of the cold air in the freezing room.

(21) A high-functional freezing apparatus according to any one of (1) to (20), in which the freezer is replaced with a refrigerator or a refrigerator-freezer so that the frozen object is allowed to be a refrigerated preserve or a fridge-frozen preserve.

(22) A high-functional freezing method in which an object accommodated in an internal space of a freezer is quickly cooled to a predetermined temperature with an oscillating electric field and/or a alternating magnetic field applied while water is prevented from freezing, and subsequently, the object is instantaneously frozen at the predetermined temperature to be preserved with the freshness maintained high.

(23) A high-functional freezing method according to (22), in which the oscillating electric field has a variable frequency in the range of 50 Hz to 5 MHz.

(24) A high-functional freezing method according to (23), in which the frequency is continuously varied.

(25) A high-functional freezing method according to (22), in which the magnetic field is a static magnetic field and/or a variable magnetic field.

(26) A high-functional freezing method according to (25), in which the intensity of the static magnetic field is in the range of 1 to 10,000 Gauss and the intensity of the variable magnetic field is in the range of 1 to 1,000 Gauss.

(27) A high-functional freezing method according to (25), in which the variable magnetic field is generated by applying an alternating current to a plurality of electromagnetic coil units being disposed so as to be across a holder or so as to surround or sandwich the holder holding the object or on which the object is placed in the internal space of the freezer, and being arranged in parallel, in series, or crosswise along the holder.

(28) A high-functional freezing method according to (27), in which each of the electromagnetic coil units comprises: a coil base with a predetermined shape for forming a coil; an electromagnetic coil formed of a predetermined turns of highly conductive wire with an insulative coating, wound around the coil base; and a caulking compound sealing the electromagnetic coil.

(29) A high-functional freezing method according to any one of (22) to (28), in which ionic air is added to cold air in the freezer.

(30) A high-functional freezing methods according to any one of (22) to (29), wherein the surface of inside wall of the freezer comprise a material capable of absorbing far infrared rays.

(31) A high-functional freezing method according to any one of (22) to (30), in which the cold air in the freezer is passed through a highly heat-conductive honeycomb.

(32) A uniform variable magnetic field generator which comprises a magnetic field generator contained in a freezing apparatus and a variable magnetic field generator having electromagnetic coil units through which an alternating current is passed to apply a variable magnetic field to an object in a closed space, the electromagnetic coil units being disposed so as to be able to apply the uniform variable magnetic field to the object, in such a manner as to be across a hold for placing the object on or holding the object, or as to around or sandwich the holder, and a plurality of electromagnetic coil units is arranged in parallel, in series, or crosswise along the holder.

(33) A uniform variable magnetic field generator according to (32), in which each of the electromagnetic coil units comprises: a coil base with a predetermined shape for forming a coil; an electromagnetic coil formed of a predetermined turns of highly conductive wire with an insulative coating, wound around the base; and a caulking compound sealing the electromagnetic coil.

(34) A uniform variable magnetic field generator according to (33), in which the coil base comprises an electrically insulative, water-resistant, heat-resistant, and magnetically permeable material.

(35) A uniform variable magnetic field generator according to (34), in which the material is a plastic.

(36) A uniform variable magnetic field generator according to any one of (32) to (35), in which the uniform variable magnetic field generator operates in a liquid of water, seawater, or alcohol.

(37) A uniform variable magnetic field generator according to any one of (32) to (36), in which the electromagnetic coil units are movably disposed.

(38) A freezing apparatus including the uniform variable magnetic field generator as set forth in any one of (32) to (37).

BEST MODE FOR CARRYING OUT THE INVENTION

Figure 1:
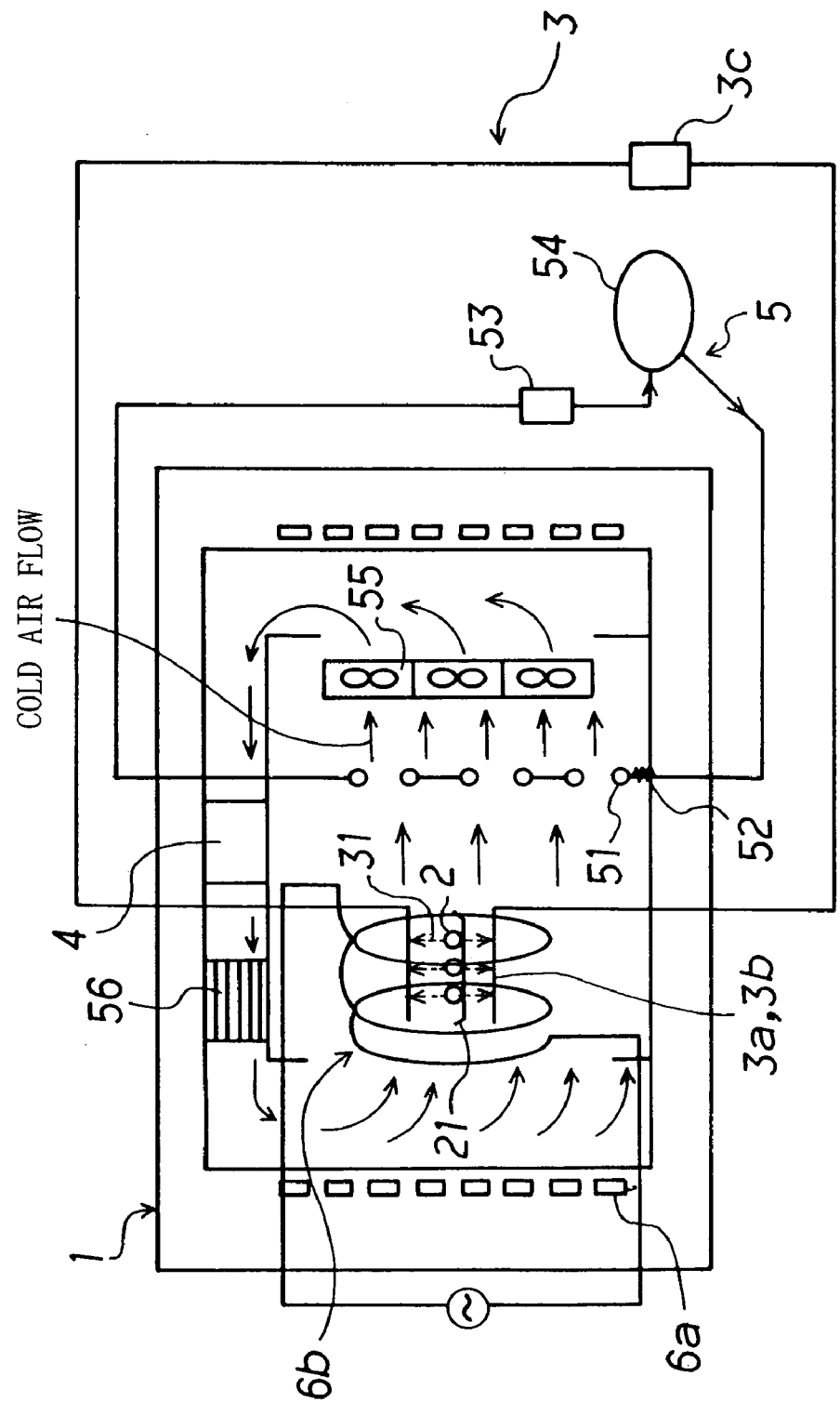
FIG. 1 is a schematic general representation of a high-functional freezing apparatus according to the present invention.

FIG. 1 shows a high-functional freezing apparatus according to the present invention.

The high-functional freezing apparatus of the present invention comprises a freezer 1; and oscillating electric field-generating means 3 for applying an oscillating electric field to objects 2 to be frozen and/or magnetic field-generating means 6 for applying a magnetic field to the objects 2.

The oscillating electric field-generating means 3 comprises a pair of electrodes 3a and 3b opposing each other so as to sandwich the objects 2; and an oscillating electric field generator 3c for applying an oscillating electric field between the pair of electrodes 3a and 3b, thus applying the oscillating electric field 31 to the objects 2 through the pair of electrodes 3a and 3b. In the present invention, preferably, the oscillating electric field generator 3c comprises a frequency generator to vary the frequency, and an amplifier circuit to apply an electric field with a desired intensity (100 to 5,000 V/cm) to the pair of electrodes.

Although FIG. 1 shows only one pair of electrodes, it is preferable that if the objects 2 accommodated in the internal space of the freezer 1 are piled on, for example, a tray in at least two stacks in the height direction, the stacks are disposed between respective pairs of electrodes.

Any type of electrode may be used, but the electrode is preferably a stainless steel or a steel plate plated with silver or gold from the viewpoint of uniformly applying an alternating electric field to the objects, or of corrosion resistance and hygiene. It is also preferable that the plate electrode has a plurality of protrusions from the viewpoint of electric energy release efficiency and applying a uniform electric field.

In the present invention, preferably, the objects accommodated in the internal space of the freezer are subjected to the application of an oscillating electric field from the oscillating electric field-generating means to cool quickly to a predetermined temperature while water is prevented from freezing, and are then frozen instantaneously at the predetermined temperature with the stopping of the application of the oscillating electric field. The predetermined temperature is preferably in the range of −20 to −40° C.

In the present invention, preferably, the oscillating electric field to be applied has a variable frequency in the range of 50 Hz to 5 MHz. More preferably, the variable frequency is 250 kHz and 3 MHz. In order to eliminate growing ice crystal nucleuses, the ice crystal nucleuses must be allowed to absorb a required electric field energy effectively. The inventor found that such an effective electric field energy is in a wavelength band at frequencies of particularly 250 kHz and 3 MHz.

When the object 2 to be frozen is cooled while an oscillating electric field 31 with variable frequency is applied to the objects, the oscillating electric field acts on the growing ice crystal nucleuses in the range of ice crystallization temperatures, thereby eliminating the growing ice crystal nucleuses. Thus, a supercooling state is achieved in which ice crystal nucleuses are prevented from being formed down to a low temperature of −10° C. or lower. In addition, suppressing ice crystallization prevents the surface of the object from freezing to allow the cold air to be transmitted to the inside of the object. Thus, the cooling rate of the objects is remarkably increased.

By applying an oscillating electric field to the objects, the objects, that is, any type of food and organisms, are preserved in frozen storage with the cells prevented from being destructed.

It is effective that the oscillating electric field is applied by continuously scanning the objects with an electric field energy at a frequency in the range of 50 Hz to 5 MHz, or by varying the frequency in stages (step by step). The temperature range of −2 to −10° C. particularly increases the electric field energy effective in eliminating the ice crystals at 250 kHz; and the temperature range of −30 to −60° C., at 3 MHz.

Accordingly, it is also effective to apply an electric field energy at a frequency of either 250 kHz or 3 MHz separately.

The oscillating electric field generator 3c used in the freezing apparatus of the present invention may control the frequency according to information from a temperature sensor.

In the present invention, the magnetic field-generating means 6 for applying a magnetic field to the objects may be used instead of the above-described oscillating electric field-generating means 3. This will produce the same effect as above.

In the present invention, preferably, the magnetic field-generating means 6 for applying a magnetic field to the objects is provided in addition to the oscillating electric field-generating means 3. By simultaneously applying an oscillating electric field and a magnetic field to the objects, the free water in the objects hydrates with protein and carbohydrate, which are ground substances in food or organisms, to change into bound water forming molecules of hydrated higher order structures. Consequently, the free water is reduced, so that the probability of ice crystallization decreases. Thus, the nucleation of ice crystals can further be prevented. Thus, the cold air can be transmitted into the inside of the objects effectively and, accordingly, the cooling rate of the objects is remarkably increased.

In the present invention, preferably, the magnetic field-generating means 6 comprises static magnetic field-generating means 6a for generating a static magnetic field and variable magnetic field-generating means 6b for generating a variable magnetic field. Preferably, the static magnetic field-generating means 6a is a set of permanent magnets and the variable magnetic field-generating means 6b is a dielectric coil.

Preferably, the permanent magnets serving as the static magnetic field-generating means 6a are disposed on a sidewall of the freezer 1 with the polarities aligned so that a static magnetic field acts on the objects 2 placed in the internal space of the freezer. FIG. 1 shows that the static magnetic field-generating means 6a is disposed on the sidewall of the freezer 1 with the polarities aligned so that the static magnetic field is applied in the vertical direction, the direction of the static magnetic field may of course be oriented in the horizontal direction. Preferably, the static magnetic field has an intensity in the range of 1 to 10,000 Gauss. In the case of a static magnetic field intensity of less than 1 Gauss, the effect of the static magnetic field is not obvious due to the influence of geomagnetism. On the other hand, in view of a manufacturing possibility of the permanent magnet, the upper limit of the static magnetic field is preferably 10,000 Gauss. The permanent magnets serving as the static magnetic field-generating means 6a may be disposed on the backside of a holder 21 for holding the objects 1 with the polarities aligned so that the static magnetic field acts on the objects 1. The holder 21 for holding the objects 2 may be, for example, a tray, a net, or a belt.

The dielectric coil serving as variable magnetic field-generating means 6b provides a variable magnetic field whose direction is varied periodically by passing an alternating current with a constant frequency through the coil. The alternating current passing through the dielectric coil preferably has a commercial frequency in the range of 50 to 60 Hz. The intensity of the variable magnetic field is preferably in the range of 1 to 1,000 Gauss in consideration of proper intensity for each type of object. While a variable magnetic field intensity of less than 1 Gauss does not produce an effect distinguishable from that of geomagnetism, an intensity of more than 1,000 Gauss makes the apparatus expensive and, thus, brings about an economical problem.

The dielectric coil may be disposed on the sidewall of the freezer. Alternatively, the dielectric coil may be disposed closer to the object 2 so that the variable magnetic field acts on the objects effectively in such a manner as to be across the holder holding the object 2 or as to sandwich or surround the holder, without blocking the cold air.

Figure 3:
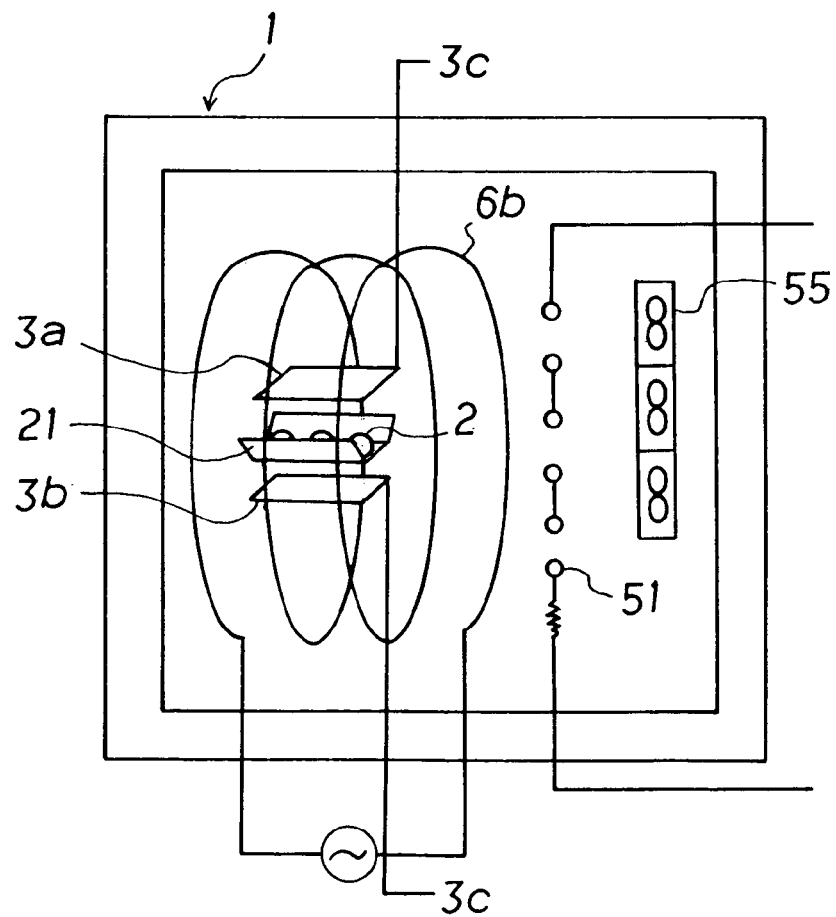
FIG. 3 is a schematic general sectional view of a variable magnetic field generator according to the present invention.

If the dielectric coil surrounds the holder holding the object 2, preferably, the dielectric coil 6b is provided in such a manner that the winding of the dielectric coil surrounds the object 2 and the holder so that the flow of the cold air is not interrupted, as shown in FIGS. 1 and 3. By disposing the dielectric coil 6b closer to the objects 2, as shown in FIGS. 1 and 3, a variable magnetic field can act on the objects uniformly and effectively and, consequently, the nucleation of ice crystals can further be prevented.

Although the dielectric coil is disposed so that the variable magnetic field acts on the objects horizontally in FIGS. 1 and 3, it is not limited to this. It goes without saying that the variable magnetic field may be applied in a direction parallel to or perpendicular to the static magnetic field.

In the present invention, in order to prevent the destruction of the object cells, the above-described oscillating electric field and/or the variable magnetic field are applied to the objects so as to suppress the nucleation of ice crystals. In addition, it is preferable to quickly lower temperature so as to pass through a maximum ice crystallization temperature range in which coarse ice crystals are produced at a high rate. For this purpose, an ionic air generator 4 is preferably provided to add ionic air to the cold air for cooling the objects. The ionic air generator may be disposed in any location as long as the cold air for cooling the objects can circulate.

The cold air for cooling the objects is generated by freezing means 5 and supplied to the objects 2 by air blowing means 55 provided inside the freezer 1. In the present invention, preferably, ionic air constituted of negative air ions, generated by the ionic air generator 4 is added to the cold air blown from the air blowing means 55. By supplying the cold air containing the ionic air, direct heat transfer to the objects is accelerated and, thus, heat is absorbed from the objects to promote rapid decrease in temperature of the objects.

Preferably, the cold air supplied to the objects 2 from the air blowing means 55 has a wind velocity of 1 to 5 m/s from the viewpoint of promoting convection heat transfer. A wind velocity of less than 1 m/s of the cold air leads to convection heat transfer insufficient to ensure rapid decrease in temperature. In contrast, a wind velocity of more than 5 m/s of the cold air vaporizes a water layer produced on the surfaces of the objects. Thus, the objects become liable to be oxidized.

Figure 2:
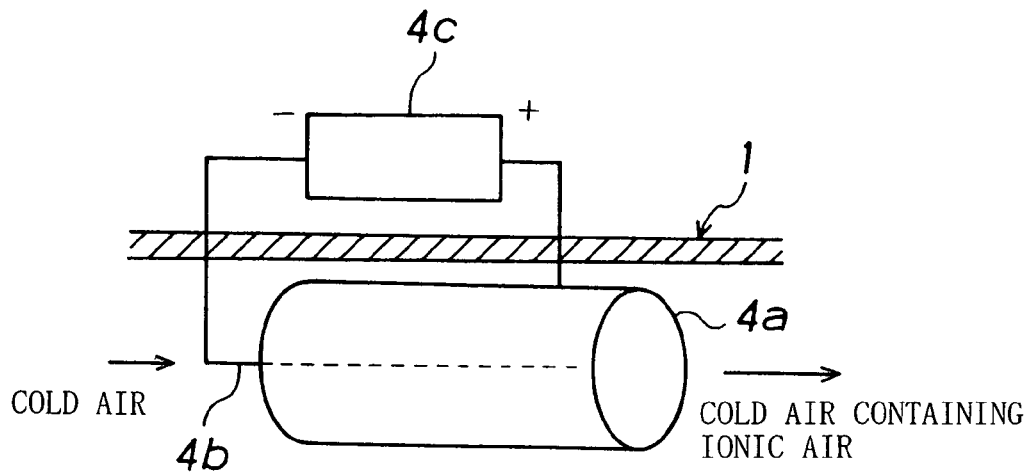
FIG. 2 is a schematic general sectional view of an ionic air flow generator according to the present invention.

The ionic air generator 4 preferably includes a tubular anode 4a, a linear cathode 4b entering into the inside of the tubular anode 4a, and a voltage generator 4c for applying a voltage between the anode 4a and the cathode 4b, as shown in FIG. 2.

The voltage applied between the anode and the cathode is preferably 10,000 V/cm or less, and more preferably 7,000 V/cm or less. Thus, the cold air (air) is ionized into negative ions at the cathode. Since the negative ions are drawn to the anode, the other air not ionized is also drawn together and, thus ionic air is generated.

In the ionic air generator 4 of the present invention, preferably, the tubular anode 4a and the linear cathode 4b entering into the inside of the anode are used in combination. Thus, the ionic air is efficiently added to the cold air.

Preferably, the tubular anode 4a and the linear cathode 4b are formed of the same material, and more preferably of a stainless steel or a steel plated with silver or gold, from the viewpoint of corrosion resistance and hygiene.

In the present invention, the freezing means 5 for generating cold air uses a conventionally known freezing cycle that includes a compressor 53, a condenser 54, an expansion valve 52, and a cooling pipe (evaporator) 51 that are combined in series so as to circulate a cooling medium. The expansion valve 52 and the cooling pipe (evaporator) 51 are disposed in the internal space of the freezer 1 to contribute to generating cold air.

In the present invention, preferably, the internal wall surfaces of the freezer are constituted of a material capable of absorbing far infrared rays so as to help temperature of the object decrease quickly. In the present invention, the material capable of absorbing for infrared rays may be applied onto the internal walls as a coating, or a plate formed of the material may be disposed on the internal walls. Thus, radiant heat (far infrared rays) from the objects is rapidly absorbed to help the temperature of the objects decrease quickly. The material capable of absorbing far infrared rays absorbs heat of the objects in proportion to the fourth power of the difference $\Delta T$ in temperature between the objects and the internal walls, thus greatly contributing to rapid cooling of the objects. The material capable of absorbing far infrared rays, in the present invention, refers to a material having an absorptance of 95% or more for far infrared rays in the wavelength band of 5 to 1,000 μm. For example, a ceramic, such as silica, alumina, or iron oxide, may be used.

In addition, preferably, a highly heat-conductive honeycomb 56 is provided in the flow path of the cold air in the freezer. By introducing cold air into the honeycomb 56, the decrease in temperature of the cold air and the uniformization of the cold air flow can be promoted. Although the structure of the honeycomb 56 is not particularly limited as long as cold air can pass through it, it is preferable that the honeycomb has a grid-like section and allows the air to pass through in the longitudinal direction. Also, although the location of the honeycomb is not particularly limited as long as the honeycomb is disposed in the flow path of the cold air, it is preferable that the honeycomb is disposed at the outlet side of the ionic air generator 4, that is, at the downstream side of the cold air flow path, as shown in FIG. 1, from the viewpoint of providing cold air whose temperature is more uniformly lowered. The highly heat-conductive material of the honeycomb is preferably a stainless steel. Preferably, the dimensions of the honeycomb are appropriately determined according to the dimensions of the freezer.

It goes without saying that a heat insulator is provided between the external walls and the internal walls of the freezer 1 though FIG. 1 does not show the heat insulator.

The freezing apparatus shown in FIG. 1 is of a rack type, but not limited to this. It goes without saying that a conventional freezing apparatus, such as of tunnel type or spiral type, may be used.

In the present invention, preferably, the foregoing dielectric coil is replaced with a uniform variable magnetic field generator including a plurality of electromagnetic coil units 61 as the variable magnetic field generating means 6b.

Each electromagnetic coil unit 61 comprises a coil base 611 having a predetermined shape and an electromagnetic coil 612 formed of a predetermined turns of a highly conductive wire 612a with an insulative coating, wound around the coil base 611. The electromagnetic coil 612 is sealed with a caulking compound 613. Preferably, the coil base has a case-like section so as to house the electromagnetic coil. The coil base having the case-like section, accomodating the electromagnetic coil sealed with the caulking compound 613 is provided with a cover formed of the same material, which is bonded to the coil base with an adhesive or the like. Thus, the electromagnetic coil unit 61 containing the electromagnetic coil 612 is completed.

Preferably, the coil base 611 is formed of an electrically insulative, water-resistant, heat-resistant, and magnetically permeable material. Preferred materials include plastics, rubber, wood, and their composite.

The coil base 611 having the case-like section preferably has a predetermined shape according to the holder for placing the object on or holding the objects, but is not particularly limited. If the holder is of a rack type, a rectangular or square ring is preferable; if the holder is of a net belt conveyor type, a rectangular or square ring is preferable.

The highly conductive wire is, for example, a single or stranded Cu wire (copper wire). The highly conductive wire wound around the coil base to serve as the electromagnetic coil is coated with a highly electrically insulative film. Exemplary highly electrically insulative coating includes polyimide resin, nylon, and polytetrafluoroethylene (trade name: Teflon).

Figure 4:
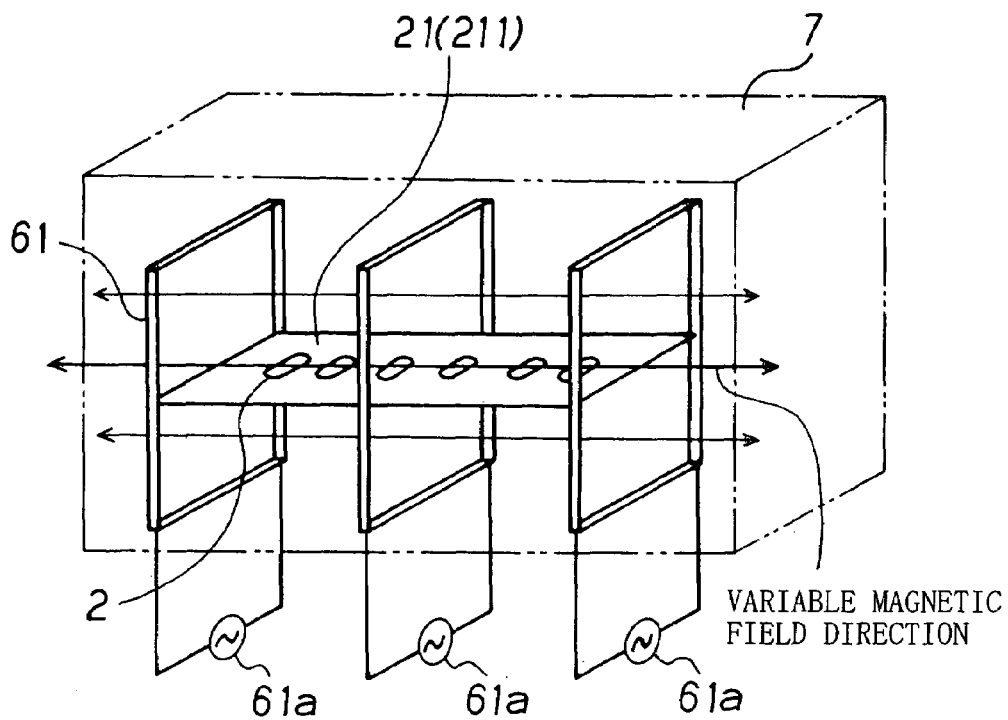
FIG. 4 is a schematic general representation of a uniform variable magnetic field generator according to the present invention.

FIG. 4 schematically shows an example of the electromagnetic coil unit 61 using a rectangular ring-shaped base. A variable magnetic field is generated by applying alternating current to the electromagnetic coil units 61 having the above-described structure. However, it goes without saying that the present invention does not limit the form of the coil unit to this. Preferably, the intensity of the variable magnetic field is set at a desired level according to the magnitude of alternating current applied to the coil, the number of turns of the coil, and other factors.

The uniform variable magnetic field generator of the present invention has, preferably, the foregoing electromagnetic coil units 61, and alternating current is applied to the electromagnetic coil units to generate a variable magnetic field, thereby applying a uniform variable magnetic field to the objects in a closed space. It goes without saying that the variable magnetic field generator includes alternating current-applying means 61*a* for applying an alternating current to the electromagnetic coil units though the description is omitted.

In the uniform variable magnetic field generator of the present invention, the electromagnetic coil units 61 are disposed in the closed space 7 so as to uniformly apply a variable magnetic field to the objects, in such a manner as to be across the holder 21 holding the objects 2 or on which the object 2 is placed, or as to surround or sandwich the holder 21. The plurality of electromagnetic coil units 61 are also arranged in parallel, in series, or crosswise along the holder 21. By using the plurality of electromagnetic coil units 61, a variable magnetic field with a uniform intensity can be provided, and the variable magnetic field with the uniform intensity can be applied to the objects.

It is preferable that the number of and the intervals between the electromagnetic coil units 61 are appropriately set according to the length of the holder, the uniformity of the magnetic field intensity, and so forth.

The uniform variable magnetic field generator can operate in water, seawater, and other liquid, such as alcohol, as well as in the air because of the use of the electromagnetic coil units hermetically containing the electromagnetic coil 612.

Preferably, in the uniform variable magnetic field generator, the electromagnetic coil units 61 are disposed movably. The movably arranged electromagnetic coil units 61 can easily adapt to the variations of type, shape, and arrangement of the objects.

Figure 5:
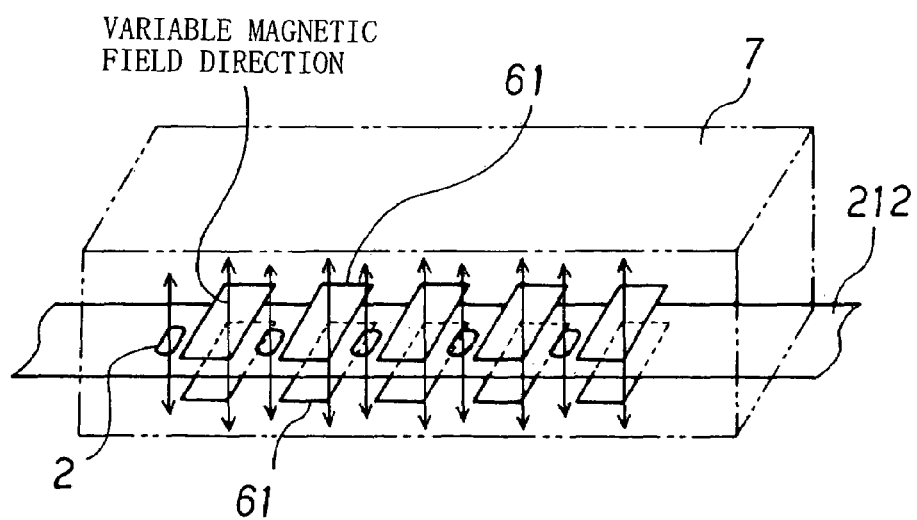
FIG. 5 is a schematic general representation of a uniform variable magnetic field generator according to the present invention.

FIGS. 4 and 5 show examples of the uniform variable magnetic field generator of the present invention.

In FIG. 4, the holder 21 for placing the objects 2 on or holding the objects 2 is of a rack-type tray. In FIG. 4, three electromagnetic coil units 61 are arranged in parallel along the holder 21, that is, the rack-type tray 211, in such a manner as to surround the holder 21.

In FIG. 5, the holder 21 for placing the objects 2 on or holding the objects 2 is of a net belt conveyor 212. In FIG. 5, the electromagnetic coil units 61 are arranged in such a manner as to sandwich the holder 21.

In FIG. 5, five pairs of rectangular ring-shaped electromagnetic coil units 61 are arranged in parallel along the holder 21 or net belt conveyor 212 in such a manner that each pair of the electromagnetic coil units 61 is separated above and below by the holder 21 or net belt conveyor 212. It goes without saying that each electromagnetic coil unit is connected to the alternating current-applying means 61*a* though the figures do not show it.

Even when the holder 21 is of the net belt conveyor 212, the electromagnetic coil units 61 may be disposed at only one side of the net belt conveyor such as to be across or cover the net belt conveyor, for applying a variable magnetic field to the objects.

By applying an alternating current to the electromagnetic coils 612 of the electromagnetic coil units 61 from the alternating current-applying means 61*c*, a variable magnetic field is generated. The variable magnetic fields in FIGS. 4 and 5 are generated respectively parallel and perpendicular to the holder to apply a uniform variable magnetic field. While FIGS. 4 and 5 show the electromagnetic coil units disposed in parallel along the holder 21, the electromagnetic coil units may be disposed in series or crosswise. It goes without saying that this is different in only the direction in which the magnetic field is applied to the objects and that perfectly the same effects are produced by the application of a variable magnetic field.

The "closed space" in the present invention may be, for example, a freezer, a refrigerator, or a refrigerator-freezer.

The uniform variable magnetic field generator of the present invention, including the above-described electromagnetic coil units is incorporated with a common freezer or any other special freezer and, thus, can be broadly used.

A freezing apparatus containing a uniform variable magnetic field generator having the above-described structure of the present invention will now be described. The freezing apparatus referred to in the present invention may include a freezing apparatus, a refrigerating apparatus, or a refrigerate-freezing apparatus.

The freezing apparatus of the present invention comprises a freezer 1 and a variable magnetic field generator for applying a variable magnetic field to objects 2 to be frozen accomodated in the internal closed space of the freezer 1. In the present invention, the variable magnetic field generator is a uniform variable magnetic field generator including a plurality of electromagnetic coil units 61 that generates a variable magnetic field by applying an alternating current. The electromagnetic coil units 61 has the above-described structure, and is disposed in such a manner as to be across the holder 21, which holds the objects 2 or on which the objects 2 are placed, or as to surround or sandwich the holder 21. The plurality of electromagnetic coil units 61 are arranged in parallel, in series, or crosswise to a holder 21. The electromagnetic coil units thus disposed apply a variable magnetic field with a uniform intensity to the objects.

Figure 8:
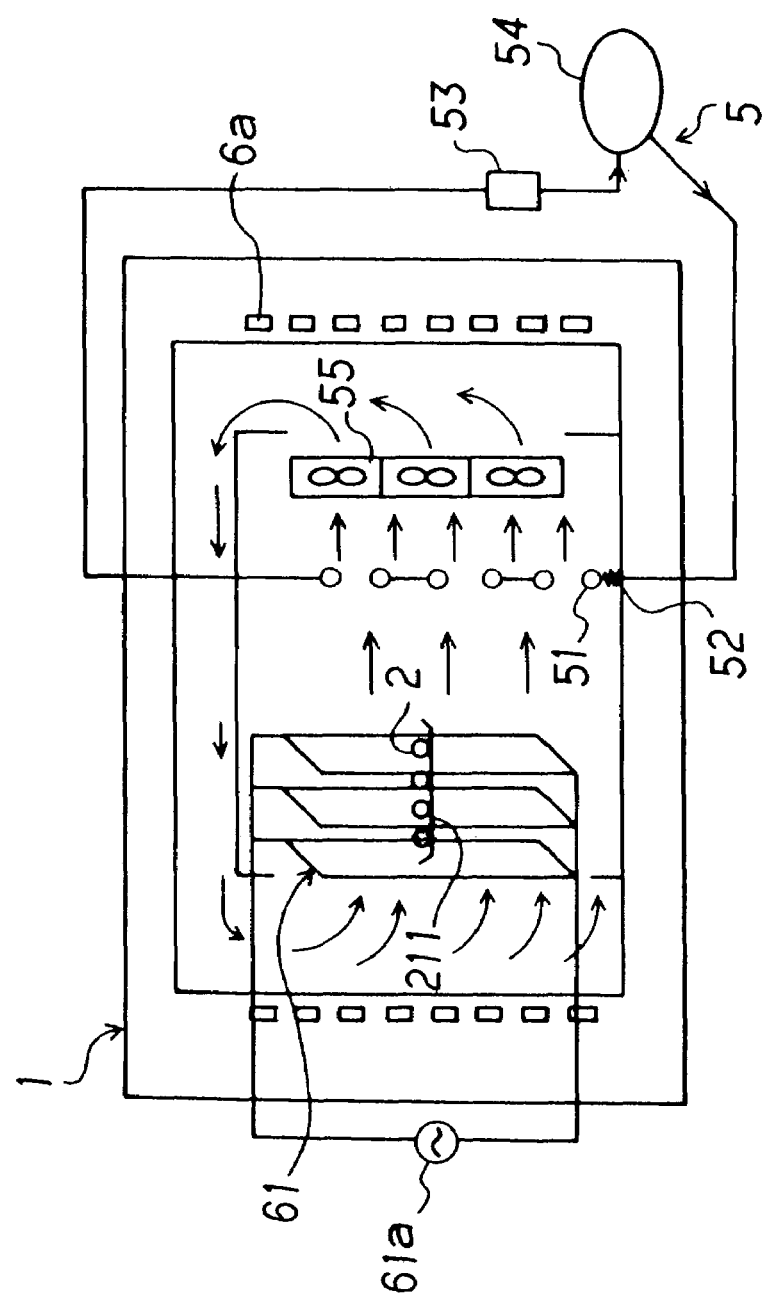
FIG. 8 is a schematic general sectional view of a freezing apparatus according to the present invention, including a uniform variable magnetic field generator.

If the freezer is of rack-type batch-type, preferably, the electromagnetic coil units 61 are disposed, so as to across the rack-type holder 21, or the rack-type tray 211, which holds the objects 2 or on which the objects are placed, as shown in FIGS. 4 and 8, or so as to surround the rack-type holder or rack-type tray 211, which holds the objects or on which the object are placed. Further the plurality of electromagnetic coil units 61 are arranged in parallel along the rack-type holder. Alternatively, the plurality of electromagnetic coil units may be arranged in series or crosswise.

The electromagnetic coil units thus disposed apply a variable magnetic field with a uniform intensity in the horizontal direction to the objects.

FIG. 5 shows a tunnel-type freezer in which the objects are continuously conveyed into the internal closed space of the freezer one after another by a net conveyor belt to be accommodated and frozen. In this instance, preferably, each electromagnetic coil unit 61 of pairs are disposed above and below the holder 21, that is net conveyor belt 212, holding the objects 2 so that each pair is separated by the holder, and the pairs of the electromagnetic coil units are disposed in parallel in the moving direction of net conveyor belt. The electromagnetic coil units thus disposed apply a variable magnetic field with a uniform intensity in the vertical direction to the objects to be frozen.

Figure 6:
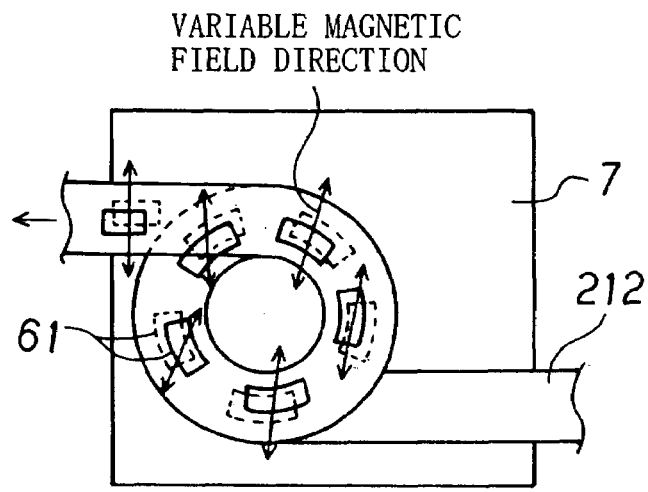
FIG. 6 is a schematic general representation of a uniform variable magnetic field generator according to the present invention.
Figure 7:
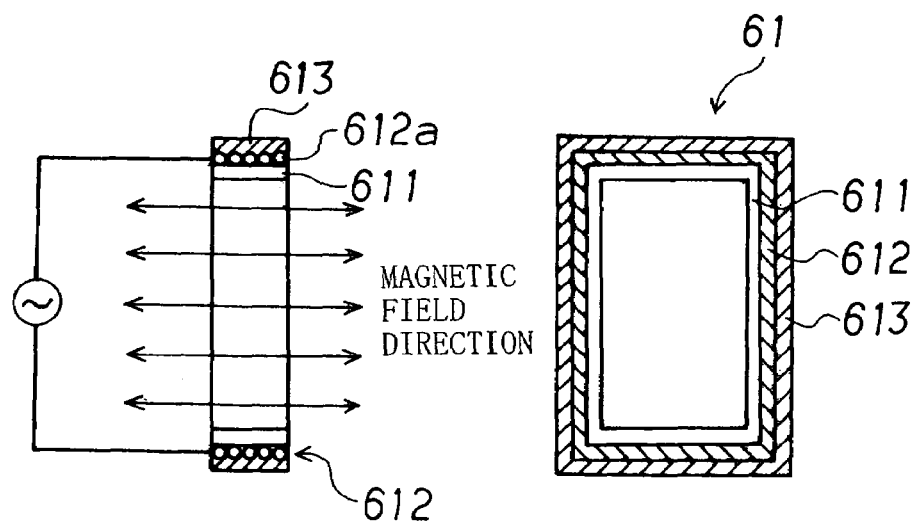
FIG. 7 is a general representation of an electromagnetic coil unit suitable for the uniform variable magnetic field generator of the present invention.

FIG. 6 shows a spiral-type freezer in which the objects are continuously conveyed into the internal closed space of the freezer one after another by a net conveyor belt to be accommodated in a spiral manner and to be frozen while being conveyed upward. In this instance, preferably, pairs of the rectangular ring-shaped electromagnetic coil units 61 are disposed in parallel along the holder 21, that is net conveyor belt 212, in the moving direction of the net conveyor belt 212 so that each member of a pair is separated by the net conveyor belt 212 holding the objects 2. By applying an alternating current to the electromagnetic coil units thus disposed, a variable magnetic field with a uniform intensity is applied to the objects to be frozen.

It goes without saying that the freezing apparatus of the present invention includes freezing means 5 for generating cold air for cooling the objects 2 housed in the internal space of the freezer and air blowing means 55 for supplying the cold air to the objects provided in the freezer, as shown in FIG. 8, in addition to the above-described freezer 1 and variable magnetic field-generating means 6b. It goes without saying that a heat insulator is provided between the external walls and the internal walls of the freezer 1 though the figures do not show the heat insulator.

The freezing means 5 uses any known freezing cycle including a compressor 53, a condenser 54, an expansion valve 52, and a cooling pipe (evaporator) 51 that are combined in series so as to circulate a cooling medium. The expansion valve 52 and the cooling pipe (evaporator) 51 are disposed in the internal space of the freezer 1 to contribute to generating cold air. Preferably, the internal wall surfaces of the freezer are constituted of a material capable of absorbing far infrared rays so as to help the object temperature decrease quickly. The material capable of absorbing far infrared rays may be applied onto the internal walls as a coating, or a plate formed of the material may be disposed on the internal walls. Thus, radiant heat (far infrared rays) from the objects is rapidly absorbed to help the temperature of the objects decrease quickly. The material capable of absorbing far infrared rays absorbs heat of the objects in proportion to the fourth power of the difference $\Delta T$ in temperature between the objects and the internal walls, thus greatly contributing to rapid cooling of the objects.

Figure 9:
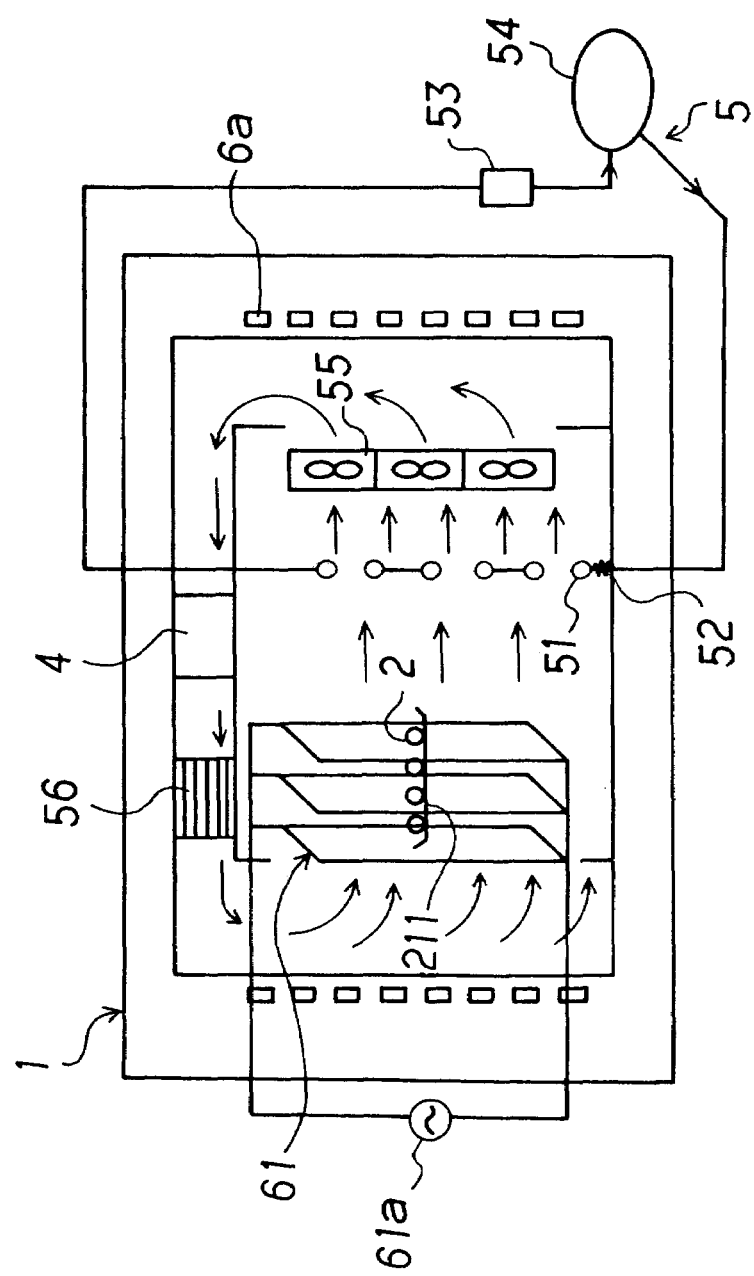
FIG. 9 is a schematic general sectional view of a freezing apparatus according to the present invention, including a uniform variable magnetic field generator.

Ionic air constituted of negative air ions, generated by the ionic air generator 4 may be added to the cold air blown from the air blowing means 55, as shown in FIG. 9. By supplying the cold air containing the ionic air, direct heat transfer to the objects is accelerated and, thus, heat is absorbed from the objects to promote rapid decrease in temperature of the objects. Preferably, a highly heat-conductive honeycomb 56 is further provided in the flow path of the cold air in the freezer, as shown in FIG. 9. By introducing cold air into the honeycomb 56, the decrease in temperature of the cold air and the uniformization of the cold air flow can be promoted.

It goes without saying that the freezing apparatus of the present invention may include static magnetic field-generating means 6a for generating a static magnetic field in addition to the foregoing variable magnetic field generator.

Furthermore, it is preferable that the freezing apparatus further include oscillating electric field-generating means for applying an oscillating electric field to the objects though it is not particularly shown in the figures.

EXAMPLES

Example 1

In use of the rack-type freezer shown in FIG. 1 being the high-functional freezing apparatus of the present invention, raw chicken meat and tuna fish placed as the objects 2 on the holder 21 and accomodated in the internal space of the freezer 1 were frozen by being subjected to the action of the freezing means 5. The internal walls of the freezer 1 were provided with a material capable of absorbing far infrared rays, silica-alumina-iron oxide ceramic in this example. The specifications of the freezing apparatus used were: dimensions, 1.5 m in height by 1.5 m in width by 2.5 m in length; freezing compressor, 10 HP; cooling medium, R22.

For freezing, the oscillating electric field-generating means 3 applied an oscillating electric field; further a permanent magnet serving as the static magnetic field-generating means 6a and a dielectric coil serving as the variable magnetic field-generating means 6b applied a static magnetic field and a variable magnetic field; further the ionic air generator 4 added ionic air to cold air; or further cold air was passed through the honeycomb with a grid-like section, having a bore size of 10×10 mm and a length of 100 mm. The holder 21 holding the objects 2 was disposed between the electrodes of the oscillating electric field-generating means, as shown in FIG. 1.

A stainless steel plates with protrusions of 3 mm in height at intervals of 10 mm were used as the electrodes of the alternating electric field-generating means 3. The ionic air generator 4 included a stainless steep pipe (20 mm in diameter by 50 mm in length) as an anode and a stainless steel wire of 0.5 mm in diameter as a cathode, and a voltage of 5,000 V/cm was applied to generate ionic air.

The alternating electric field were applied in three ways: (1) electric field energy of a frequency of 250 kHz; (2) electric field of a frequency of 3 MHz; and (3) electric field energy of frequencies continuously varied in the range of 50 Hz to 5 MHz. The intensity of the electric field was set at 150 V/cm; the distance between the electrodes, 100 mm.

For comparison, freezing without application of any oscillating electric field was performed. The conditions of the electric field, magnetic field, and ionic air applied to the objects are shown in Table 1.

In freezing, the targeted central temperature of the objects was set at −20° C. and −40° C. The central temperature of the objects was measured with a thermocouple. Time required to cool the central temperature from 0° C. to −20° C. or −40° C. was compared with the time required for conventional quick freezing to evaluate the freezing ability. With reference to the time for the conventional quick freezing, the time for cooling the central temperature from 0° C. to −20° C. or −40° C. was expressed as: "Δ" when the time was the same as the reference; "□" when the time was 1% to 20% reduced; "○" when the time was 20% to 50% reduced; and "◎" when the time was 50% or more reduced.

After being stored at the temperature for three months, the frozen objects were thawed under running water of 10° C., and were subjected to quality test.

The quality was determined to be: "◎" when the cells were not destructed with the same color, flavor, and taste as the original raw food; "○" when the cells were hardly destructed with color, flavor, and taste similar to those of the original raw food; "□" when the cells were slightly destructed, but dripping was reduced with good taste; "X" when the cells were destructed with a lot of dripping and degraded color, flavor, and taste.

The total evaluation was expressed as bad (X), good (□), very good (○), or excellent (◎).

The results are shown in Table 1.

The cells of all the samples according to the present invention were not destructed, and the taste was not degraded at all. In contrast, the cells of the samples of the comparative example, in which no oscillating electric field was applied, were destructed, and the taste was degraded. The present invention produced the same effect in other fishery products, raw meats, and other food products, in addition to the chicken and tuna fish.

TABLE 1

| | | | Freezing conditions | | | | | | | |
|---|---|---|---|---|---|---|---|---|---|---|
| | | | Oscillating electric field | | Magnetic field | | | | | |
| | | | | | Static magnetic field Gaus | Variable magnetic field | | | | |
| Freezing No. | No. | Electrode* | Electric field intensity V/cm | Frequency Hz | | Frequency Hz | Magnetic field intensity Gauss | Ionic air | Honeycomb | Far infrared absorber |
| 1 | A | Stainless | 150 | 50 Hz to 3 MHz | — | — | — | — | — | — |
| 2 | B | Stainless | 150 | 250 KHz | — | — | — | — | — | — |
| 3 | C | Stainless | 150 | 3 MHz | — | — | — | — | — | — |
| 4 | D | Stainless | 150 | 250 KHz | — | — | — | Used | — | — |
| 5 | E | Stainless | 150 | 250 KHz | — | — | — | — | Used | — |
| 6 | F | Stainless | 150 | 250 KHz | — | — | — | — | — | Used |
| 7 | G | Stainless | 150 | 250 KHz | — | — | — | Used | Used | Used |
| 8 | H | Stainless | 150 | 250 KHz | 10 | 50 | 5 | Used | Used | Used |
| 9 | I | Stainless | 150 | 3 MHz | 10 | 50 | 5 | Used | Used | Used |
| 10 | J | Stainless | 150 | 50 Hz to 5 MHz | 10 | 50 | 5 | Used | Used | Used |
| 11 | K | Stainless | 150 | 50 Hz to 5 MHz | — | 50 | 5 | Used | Used | Used |
| 12 | M | — | — | — | — | — | — | — | — | — |
| 13 | N | — | — | — | — | — | — | — | — | Used |

| | Freezing time | | Frozen object quality | | Evaluation | |
|---|---|---|---|---|---|---|
| Freezing No. | Relative time for cooling the central temperature from 0° C. to −20° C. | Relative time for cooling the central temperature from 0° C. to −40° C. | Species | | Total evaluation | Remark |
| | | | Chicken | Tuna | | |
| 1 | ○ | ○ | ○ | ○ | ○ | Example |
| 2 | ○ | ○ | ○ | ○ | ○ | Example |
| 3 | ○ | ○ | ○ | ○ | ○ | Example |
| 4 | ○ | ○ | ○ | ○ | ○ | Example |
| 5 | ○ | ○ | ○ | ○ | ○ | Example |
| 6 | ○ | ○ | ○ | ○ | ○ | Example |
| 7 | ○ | ○ | ○ | ○ | ○ | Example |
| 8 | ◎ | ◎ | ◎ | ◎ | ◎ | Example |
| 9 | ◎ | ◎ | ◎ | ◎ | ◎ | Example |
| 10 | ◎ | ◎ | ◎ | ◎ | ◎ | Example |
| 11 | ◎ | ◎ | ◎ | ◎ | ◎ | Example |

TABLE 1-continued

| | | | | | | |
|---|---|---|---|---|---|---|
| 12 | Δ | Δ | X | X | X | Comparative example |
| 13 | □ | □ | □ | □ | □ | Comparative example |

*Stainless, stainless steel plate electrode with protrusions

Example 2

A variable magnetic field was generated with a uniform variable magnetic field generator including the electromagnetic coil units 61 disposed in parallel in the longitudinal direction of the rack-type holder 211, as shown in FIG. 4. Four electromagnetic coil units 61 were disposed in parallel in the longitudinal direction of the rack-type holder 211. Each electromagnetic coil unit 61 comprised a rectangular ring-shaped plastic base 611 of 1.2 m in length by 0.7 m in width, having a case-like, U-shaped section with a bore-size of 4 cm×4 cm and an electromagnetic coil 612 formed of 600 turns of copper wire 612a coated with a polyimide resin, wound around the coil base. The electromagnetic coil 612 was subjected to caulking. Then, a cover was bonded to the case-shaped base with an adhesive and, thus, the electromagnetic coil unit containing the electromagnetic coil was completed.

A coil current of 1 A being an alternating current with a commercial frequency of 50 Hz was passed through the electromagnetic coil units 61 from the alternating current-applying means 61a to generate a variable magnetic field. The intensities of the magnetic field at several points on the rack-type holder 21 were measured to evaluate the uniformity of the magnetic field. For the measurement of the magnetic field intensity, a gauss meter was used. As a result, it has been shown that the magnetic field intensity on the rack-type holder 211 was in the range of 5 to 7 Gauss, being hardly varied and that a uniform magnetic field can be applied to the objects.

Objects were frozen as in Example 1 using a freezing apparatus shown in FIG. 9, including the above-described uniform variable magnetic field generator. After being stored for three months at the temperature at which the objects were frozen, the frozen objects were thawed under running water of 10° C., and were subjected to quality test with the same reference as in Example 1.

The results are shown in Table 2. In addition, freezing with application of oscillating electric field, not shown in FIG. 9, was also performed.

According to the present invention, the cells of food were not destructed and the taste was not degraded at all.

TABLE 2

| | | | Freezing conditions | | | | | | | | |
|---|---|---|---|---|---|---|---|---|---|---|---|
| | | | Alternating electric field | | | Magnetic field | | | | | |
| | | | | | | | Variable magnetic field | | | | |
| Freezing No. | No. | Electrode* | Electric field intensity V/cm | Frequency Hz | Static magnetic field Gauss | Type | Frequency Hz | Magnetic field intensity Gauss | Ionic air | Honeycomb | Far infrared absorber |
| 21 | P | — | — | — | — | FIG. 4 | 50 | 5 to 7 | Used | Used | Used |
| 22 | Q | — | — | — | 10 | FIG. 4 | 50 | 5 to 7 | Used | Used | Used |
| 23 | R | Stainless | 150 | 50 Hz to 5 MHz | 10 | FIG. 4 | 50 | 5 to 7 | Used | Used | Used |

| | Freezing time | | Frozen object quality Evaluation | | | |
|---|---|---|---|---|---|---|
| | Relative time for cooling the central temperature | Relative time for cooling the central temperature | | | | |
| Freezing No. | from 0° C. to −20° C. | from 0° C. to −40° C. | Species | | Total evaluation | Remark |
| | | | Chicken | Tuna | | |
| 21 | ○ | ○ | ○ | ○ | ○ | Example |
| 22 | ○ | ⊥ | ○ | ○ | ○ | Example |
| 23 | ⊚ | ⊚ | ⊚ | ⊚ | ⊚ | Example |

*Stainless, stainless steel plate electrode with protrusions

Example 3

A variable magnetic field was generated with a uniform variable magnetic field generator including a plurality of electromagnetic coil units 61 disposed in parallel in the moving direction of the holder (net conveyer belt 212), as shown in FIG. 5. Electromagnetic coil units 61 were disposed above and below the net conveyer belt 212 of 1 m in width by 10 m in length so that each member of a pair of the electromagnetic coil units is separated by the net conveyer belt 212 with a distance of 10 cm from the net conveyer belt 212. Forty pairs of electromagnetic coil units 61 were disposed along the moving direction of the net conveyer belt 212 at intervals of 20 cm. Each electromagnetic coil unit 61 comprised a rectangular ring-shaped coil base made by plastics of 1.0 m in length by 0.6 m in width, having a thickness of 4 cm and an electromagnetic coil formed of 600 turns of copper wire coated with a polyimide resin, wound around the coil base. The electromagnetic coils were subjected to caulking.

A coil current of 1 A being an alternating current with a commercial frequency of 50 Hz was passed through the electromagnetic coil units 61 from the alternating current-applying means 61a to generate a variable magnetic field. The intensities of the magnetic field at several points on the net conveyer belt 212 were measured to evaluate the uniformity of the magnetic field, as in Example 1. As a result, it has been shown that the magnetic field intensity on the net conveyer belt 212 was in the range of 5 to 7 Gauss with small variation, and that a uniform magnetic field can be applied to the objects.

Example 4

A variable magnetic field was generated in the spiral-type freezer shown in FIG. 6 with a uniform variable magnetic field generator including a plurality of electromagnetic coil units 61 disposed in parallel in the moving direction of the net belt conveyer 212. Electromagnetic coil units 61 were disposed above and below the net belt conveyer 212 (15 cm in width by 10 m in length) so that each member of a pair of the electromagnetic coil units is separated by the net belt conveyer 212 with a distance of 10 cm from the net bet conveyer. Forty pairs of electromagnetic coil units 61 were disposed along the moving direction of the net belt conveyer 212 at intervals of 20 cm. Each electromagnetic coil unit 61 comprised a rectangular ring-shaped coil base made by plastics of 10 cm in length by 50 cm in width, having a thickness of 2 cm and an electromagnetic coil formed of 600 turns of copper wire coated with a polyimide resin, wound around the coil base. The electromagnetic coils were subjected to caulking.

A coil current of 1 A being an alternating current with a commercial frequency of 50 Hz was passed through the electromagnetic coil units 61 from the alternating current-applying means 61a to generate a variable magnetic field. The intensities of the magnetic field at several points on the net conveyer belt 212 were measured to evaluate the uniformity of the magnetic field, as in Example 1. As a result, it has been shown that the magnetic field intensity on the net conveyer belt 212 was in the range of 5 to 7 Gauss with small variation, and that a uniform magnetic field can be applied to the objects.

INDUSTRIAL APPLICABILITY

As described in detail above, the present invention promotes convection heat transfer to achieve quick freezing and, further, suppress the nucleation of ice crystals down to a low temperature to achieve instantaneous freezing. Thus, the present invention makes possible more efficient high-functional freezing to freeze and preserve any type of food products, foodstuffs, and organisms without destructing their cells, thus producing an especial industrial effect.

Furthermore, the present invention allows a variable magnetic field with a uniform intensity to be applied to an objects to be frozen or subjected to other treatment, accommodated in a closed space, such as a freezer. Thus, high-functional freezing is still more efficiently achieved.

The invention claimed is:

1. A high-functional freezing apparatus comprising:
a freezer;
oscillating electric field-generating means for applying an oscillating electric field to an object or objects to be frozen accommodated in or being conveyed in succession to an internal space of the freezer; and
magnetic field-generating means for applying a magnetic field to the object or the objects, wherein,
the oscillating electric field has one of
i) a variable frequency which varies continuously in the range of 50 Hz to 5 MHz,
ii) a variable frequency which varies in stages, step by step, in the range of 50 Hz to 5 MHz, and
iii) an alternative oscillating frequency of 250 KHz or 3 MHz, and
the freezing apparatus is high-functional by being configured to freeze and preserve any type of food products, food stuffs, and organisms without destructing their cells.

2. A high-functional freezing apparatus according to claim 1, wherein the magnetic field-generating means is at least one means selected from the group consisting of static magnetic field-generating means for generating a static magnetic field and variable magnetic field-generating means for generating a variable magnetic field.

3. A high-functional freezing apparatus according to claim 2, wherein the static magnetic field-generating means is a permanent magnet.

4. A high-functional freezing apparatus according to claim 2, wherein the variable magnetic field-generating means is an electromagnetic coil.

5. A high-functional freezing apparatus according to claim 2, wherein,
the magnetic field-generating means comprises
i) the static magnetic field-generating means for generating the static magnetic field with an intensity of the static magnetic field in the range of 1 to 10,000 Gauss, and
ii) the variable magnetic field-generating means for generating the variable magnetic field with an intensity of the variable magnetic field in the range of 1 to 1,000 Gauss.

6. A high-functional freezing apparatus according to claim 3, wherein the permanent magnet is disposed on an external wall of the freezer or on the rear side of a holder for holding the object and the electromagnetic coil is disposed so as to be across the holder, so as to sandwich or so as to surround the holder, without blocking cold air.

7. A high-functional freezing apparatus according to claim 2, wherein the freezer is of a rack-type batch-style, and the variable magnetic field-generating means comprises a plurality of electromagnetic coil units that generate a variable magnetic field by passing an alternating current therethrough and each electromagnetic coil unit is disposed so as to be across or surround a holder for placing the object on or holding the object and the plurality of the coil units are arranged so as to be in parallel, in series, or crosswise to the rack-type holder.

8. A high-functional freezing apparatus according to claim 2, wherein the freezer is of a tunnel-type, and the variable magnetic field-generating means for applying a variable magnetic field to the objects being conveyed by a net conveyer belt into and frozen in the internal closed space of the freezer in succession is an apparatus for generating a variable magnetic field which comprises a plurality of electromagnetic coil units for generating the variable magnetic field by applying an alternating current, wherein a pair of electromagnetic coil units is disposed in such a manner that each electromagnetic coil unit of the pair is separated by the net conveyer belt for placing the objects on or holding the objects and a plurality of the pairs are arranged in parallel along the moving direction of the net conveyer belt.

9. A high-functional freezing apparatus according to claim 2, wherein the freezer is of a spiral-type, and the variable magnetic field-generating means for applying a variable magnetic field to the objects being conveyed by a net conveyer belt into and frozen in the internal closed space of the freezer in succession is an apparatus for generating a variable magnetic field which comprises a plurality of electromagnetic coil units for generating the variable magnetic field by applying an alternating current, wherein a pair of electromagnetic coil units is disposed in such a manner that each electromagnetic coil unit of the pair is separated by the net conveyer belt for placing the objects on or holding the objects and a plurality of the pairs are arranged in parallel along the moving direction of the net conveyer belt.

10. A high-functional freezing apparatus according to claim 7, wherein each of the electromagnetic coil units comprises: a coil base with a predetermined shape for forming a coil; an electromagnetic coil formed of a predetermined turns of highly conductive wire with an insulative coating, wound around the coil base; and a caulking compound sealing the electromagnetic coil.

11. A high-functional freezing apparatus according to claim 10, wherein the coil base comprises an electrically insulative, water-resistant, heat-resistant, and magnetically permeable material.

12. A high-functional freezing apparatus according to claim 11, wherein the material of the coil base is a plastic.

13. A high-functional freezing apparatus according to claim 1, wherein the alternating electric field-generating means comprises at least one pair of electrodes having electrodes opposing each other so as to be separated by the object and an oscillating electric field generator for applying an oscillating electric field between the electrodes.

14. A high-functional freezing apparatus according to claim 13, wherein the electrodes comprise a sheet of a stainless steel or a steel plated with silver or gold, having a plurality of protrusions.

15. A high-functional freezing apparatus according to claim 1, further comprises air blowing means for blowing cold air in the freezer to the object and an ionic air generator for adding ionic air to the cold air blown from the air blowing means.

16. A high-functional freezing apparatus according to claim 15, wherein the ionic air generator comprises a tubular anode, a linear cathode entering into the inside of the tubular anode, and a voltage generator for applying an voltage between the anode and the cathode.

17. A high-functional freezing apparatus according to claim 16, wherein the tubular anode and the linear cathode are made of stainless steel or steel plated with silver or gold.

18. A high-functional freezing apparatus according to claim 1, wherein the surface of the inside wall of the freezer comprises a material capable of absorbing far infrared rays.

19. A high-functional freezing apparatus according to claim 1, wherein a honeycomb formed of a highly heat-conductive material is provided in a flow path of the cold air in the freezer.

20. A high-functional freezing apparatus according to claim 1, wherein the freezer is part of a refrigerator-freezer so that the frozen object is allowed to be a refrigerated preserve or a fridge-frozen preserve.

21. A high-functional freezing method, comprising the steps of:
    placing an object to be frozen in an internal space of a freezer,
    quickly cooling the object to a predetermined temperature with an oscillating electric field and a alternating magnetic field applied while water is prevented from freezing, and
    subsequent to said cooling step, instantaneously freezing the object at the predetermined temperature with the freshness maintained high, wherein,
    the object is any type of food products, food stuffs, and organisms, and
    said cooling and freezing steps achieves high-functional freezing by freezing and preserving the object without destructing cells of the object and to suppress nucleation of ice crystals,
    wherein the oscillating electric field has one of
    i) a variable frequency which varies continuously in the range of 50 Hz to 5 MHz,
    ii) a variable frequency which varies in stages, step by step, in the range of 50 Hz to 5 MHz, and
    iii) an alternative oscillating frequency of 250 KHz or 3 MHz.

22. A high-functional freezing method according to claim 21, wherein the frequency is continuously varied.

23. A high-functional freezing method according to claim 21, wherein the magnetic field is a static magnetic field and/or a variable magnetic field.

24. A high-functional freezing method according to claim 23, wherein,
    said cooling step uses a magnetic field-generating means to apply the alternating magnetic field applied while water is prevented from freezing,
    the magnetic field-generating means applying a static magnetic field with an intensity of the static magnetic field in the range of 1 to 10,000 Gauss, and applying a variable magnetic field with an intensity of the variable magnetic field in the range of 1 to 1,000 Gauss.

25. A high-functional freezing method according to claim 23, wherein the variable magnetic field is generated by applying an alternating current to a plurality of electromagnetic coil units disposed so as to be across a holder or so as to surround or sandwich the holder holding the object or on which the object is placed in the internal space of the freezer, and arranged in parallel, in series, or crosswise along the holder.

26. A high-functional freezing method according to claim 25, wherein each of the electromagnetic coil units comprises:
    a coil base with a predetermined shape for forming a coil;
    an electromagnetic coil formed of a predetermined turns of highly conductive wire with an insulative coating, wound around the coil base; and
    a caulking compound sealing the electromagnetic coil.

27. A high-functional freezing method according to claim 21, wherein ionic air is added to cold air in the freezer.

28. A high-functional freezing method according to claim 21, wherein the surface of inside wall of the freezer comprise a material capable of absorbing far infrared rays.

29. A high-functional freezing method according to claim 21, wherein the cold air in the freezer is passed through a highly heat-conductive honeycomb.

30. A uniform variable magnetic field generator, which comprises:
a magnetic field generator contained in a thermally insulated closed space and a variable magnetic field generator having electromagnetic coil units through which an alternating current is passed to apply a variable magnetic field to an unattached object in the closed space,
the electromagnetic coil units being disposed so as to be able to apply the uniform variable magnetic field to the object, in such a manner as to be across a holder for placing the object on or holding the object, or as to surround or sandwich the holder, and a plurality of electromagnetic coil units is arranged in parallel, in series, or crosswise along the holder,
wherein each of the electromagnetic coil units comprises:
a coil base with a predetermined shape for forming a coil;
an electromagnetic coil formed of a predetermined turns of highly conductive wire with an insulative coating, wound around the base; and
a caulking compound sealing the electromagnetic coil.

31. A uniform variable magnetic field generator according to claim 30, wherein the coil base comprises an electrically insulative, water-resistant, heat-resistant, and magnetically permeable material.

32. A uniform variable magnetic field generator according to claim 31, wherein the material is a plastic.

33. A uniform variable magnetic field generator according to claim 30, wherein the electromagnetic coil units are movably disposed.

34. A freezing apparatus including the uniform variable magnetic field generator as set forth in claim 30.

35. A high-functional freezing apparatus according to claim 1, wherein, the oscillating electric field-generating means comprises i) a pair of electrodes (3a, 3b) opposing each other to sandwich the object (2), and ii) an oscillating electric field generator (3c) applying an oscillating electric field between the pair of electrodes (3a, 3b) to apply the oscillating electric field (31) to the object (2) through the pair of electrodes (3a, 3b), the oscillating electric field generator (3c) comprising a frequency generator to vary the frequency, and an amplifier circuit to apply an electric field with an intensity in the range of 100 to 5,000 V/cm to the pair of electrodes, the oscillating electric field-generating means configured to i) provide the oscillating electric field to cool the object to a predetermined temperature while water is prevented from freezing, and ii) eliminate growing ice crystal nucleuses while achieving a supercooling state at the predetermined temperature, the predetermined temperature is the range of −20 to −40° C., and the magnetic field-generating means for applying a magnetic field to the object comprises i) a static magnetic field-generating means (6a) for generating a static magnetic field, and ii) a variable magnetic field-generating means (6b) for generating a variable magnetic field, the static magnetic field-generating means disposed with polarities aligned so that the static magnetic field acts on the object with a static magnetic field having an intensity in the range of 1 to 10,000 Gauss, and the variable magnetic field-generating means (6b) provides a variable magnetic field whose direction is varied periodically by passing an alternating current with a constant frequency through a coil to develop an intensity of the variable magnetic field in the range of 1 to 1,000 Gauss, the variable magnetic field arranged to act on the object uniformly and effectively prevent the nucleation of ice crystals.

* * * * *